United States Patent [19]

Ekama et al.

[11] 3,940,091

[45] Feb. 24, 1976

[54] PNEUMATIC TUBE DOUBLE-DOOR SIDE OPENING CARRIER CONSTRUCTION

[75] Inventors: Peter J. Ekama, Malvern; Larry A. Morrison, North Canton; Charles B. Barnett, Akron, all of Ohio

[73] Assignee: Diebold Incorporated, Canton, Ohio

[22] Filed: Mar. 12, 1975

[21] Appl. No.: 557,616

[52] U.S. Cl. .................... 243/34; 220/255; 243/39
[51] Int. Cl.² ........................................ B65G 51/06
[58] Field of Search ............................. 243/32–35, 243/39; 220/334, 335, 255; 206/1.5; 302/2 R

[56] References Cited
UNITED STATES PATENTS

| | | | |
|---|---|---|---|
| 3,059,875 | 10/1962 | Kelley | 243/35 |
| 3,080,136 | 3/1963 | Kelley et al. | 243/34 |
| 3,189,297 | 6/1965 | Ellithorpe | 243/34 X |
| 3,231,218 | 1/1966 | Tearne | 243/34 |
| 3,237,884 | 3/1966 | Grosswiller et al. | 243/34 |
| 3,297,277 | 1/1967 | MacKenzie | 243/34 |
| 3,690,593 | 9/1972 | Kettering | 243/34 |

FOREIGN PATENTS OR APPLICATIONS

| | | | |
|---|---|---|---|
| 1,122,452 | 1/1962 | Germany | 243/34 |

*Primary Examiner*—Evon C. Blunk
*Assistant Examiner*—James L. Rowland
*Attorney, Agent, or Firm*—Frease & Bishop

[57] ABSTRACT

A pneumatic tube carrier has a payload compartment formed by a pair of side column members and spaced end plates. The carrier is formed with at least one side opening for access to the compartment which is closed by a pair of doors, with each door of the pair closing one-half of the access opening. The doors are mounted on the column members on opposite sides of the compartment by cams for swinging movement between open and closed positions. Spring-biased control rods extend longitudinally through bores formed in the side column members. The rod ends extend through the carrier end plates and engage rocker arms pivotally mounted within end cap cavities which are formed on the ends of the carrier. Pins formed on the control rods extend through slots formed in the cams for rotating the cams and their associated doors when the control rods are moved linearly within the bores. A selected rocker arm is adapted to be pivoted by an external plunger at a pneumatic tube terminal, and when actuated moves one of the control rods linearly into engagement with the other rocker arm at the opposite end of the carrier, which in turn moves the other control rod linearly in the opposite direction. The linear movements of the control rods and associated pins in the cam slots, pivot the doors to open position. Spring means return the doors to closed position after retraction of the external plunger.

18 Claims, 22 Drawing Figures

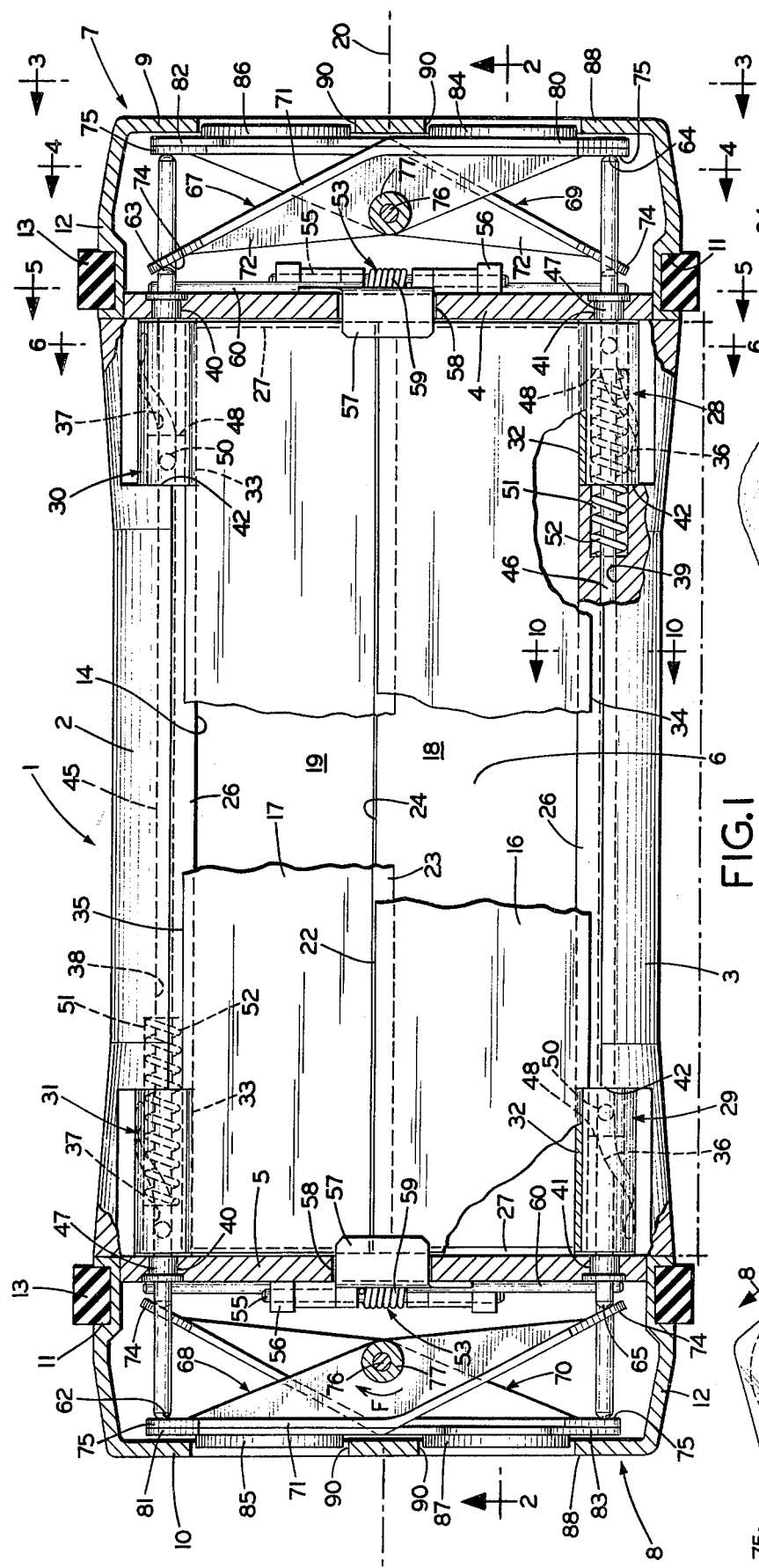
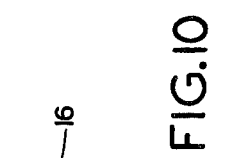
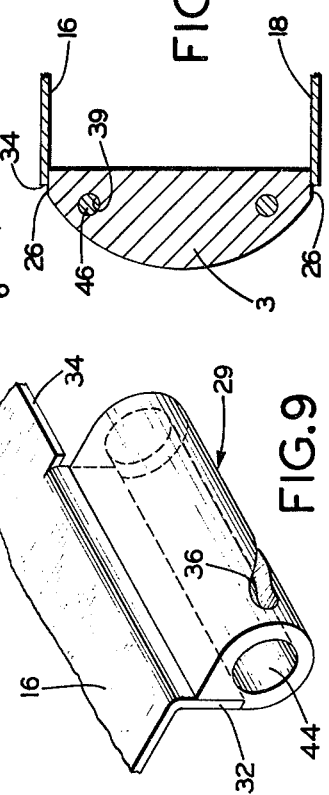
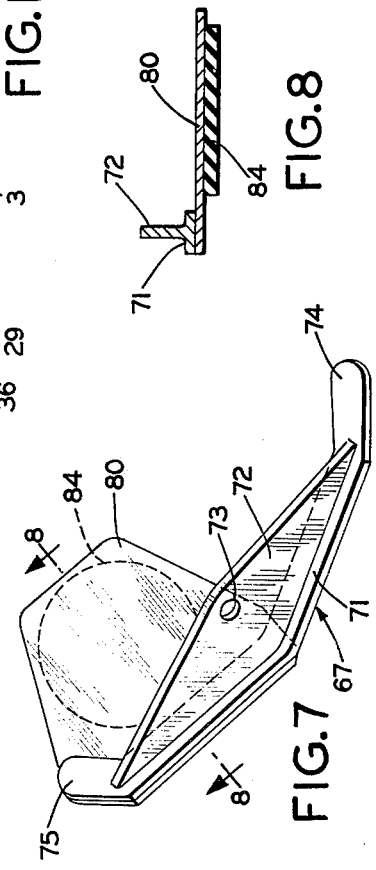

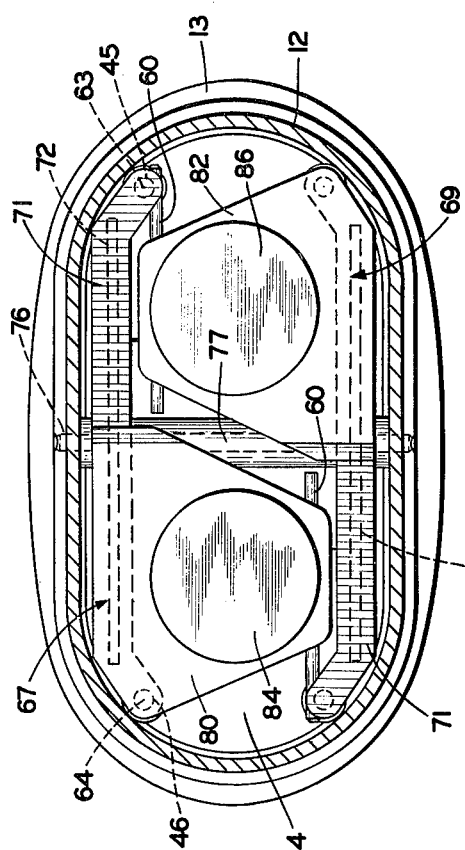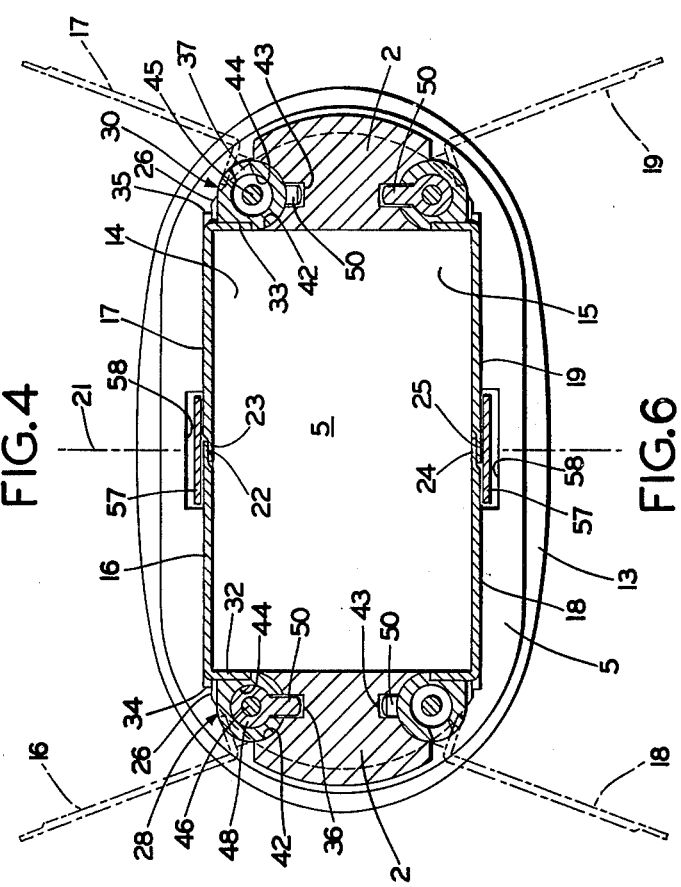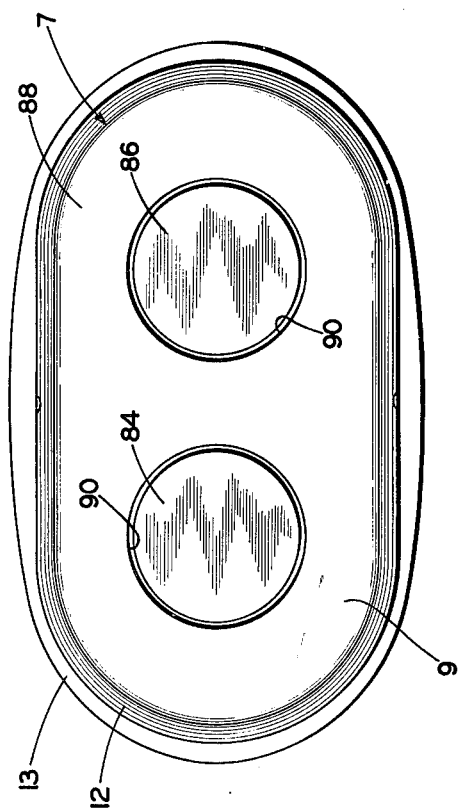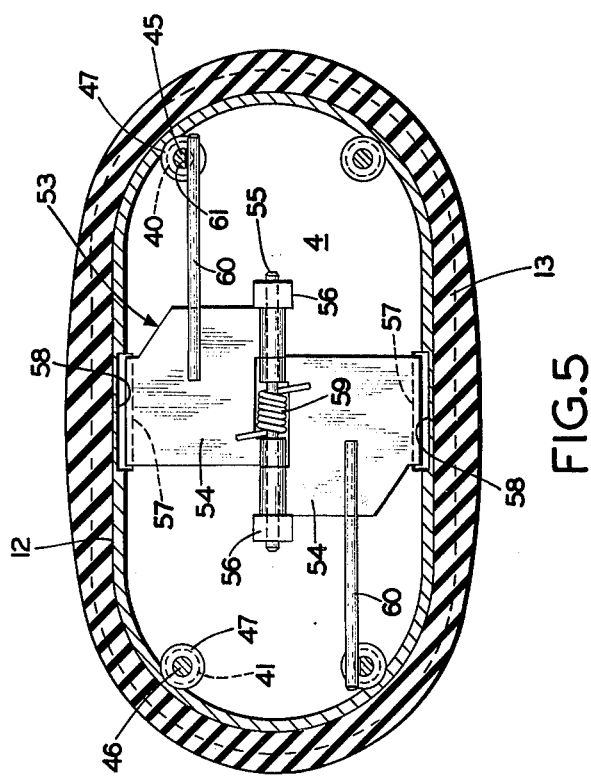

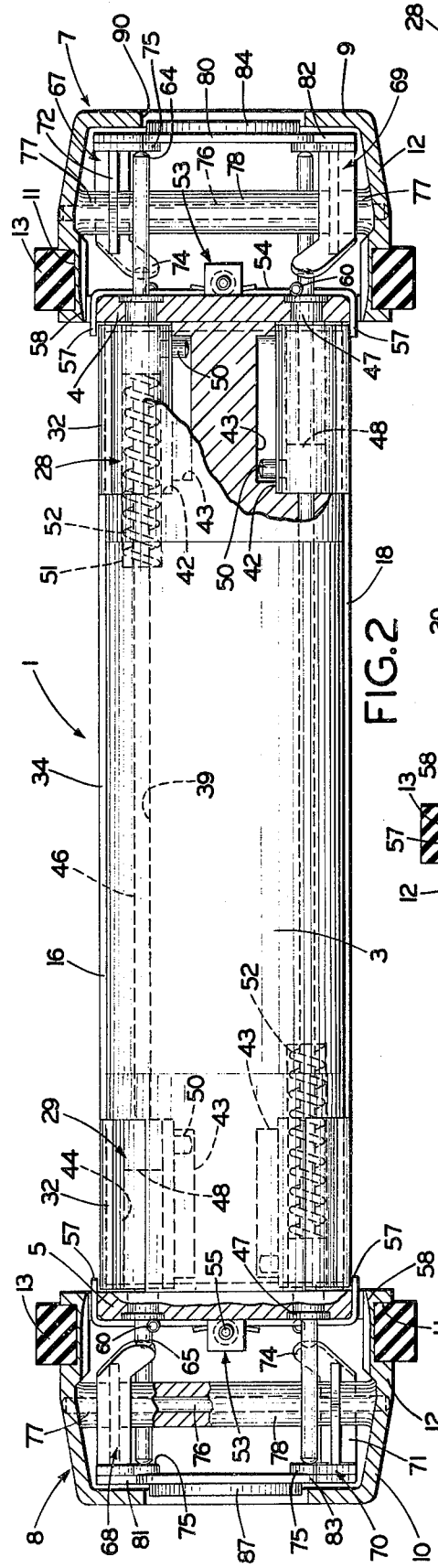
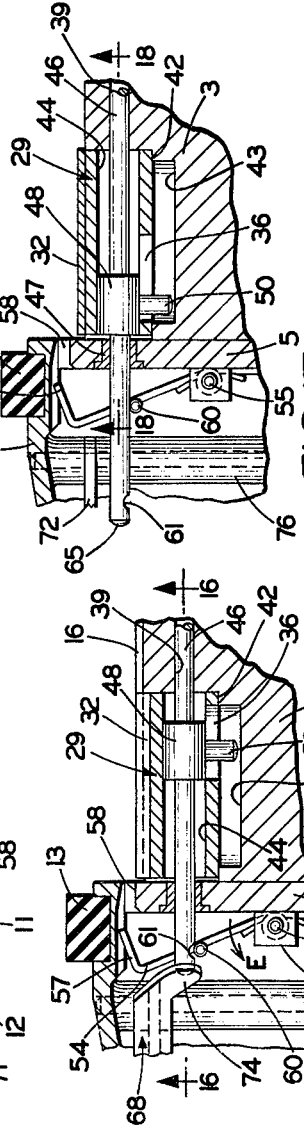
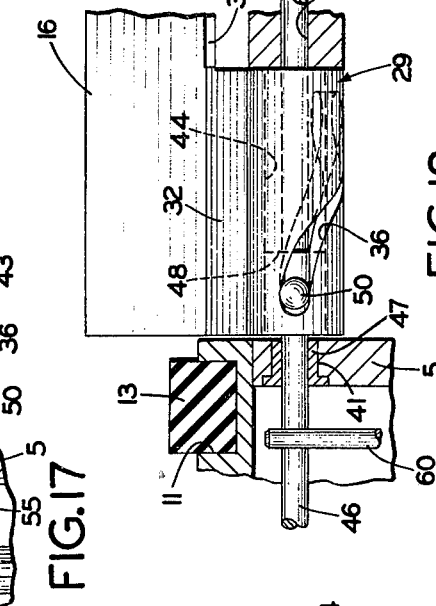
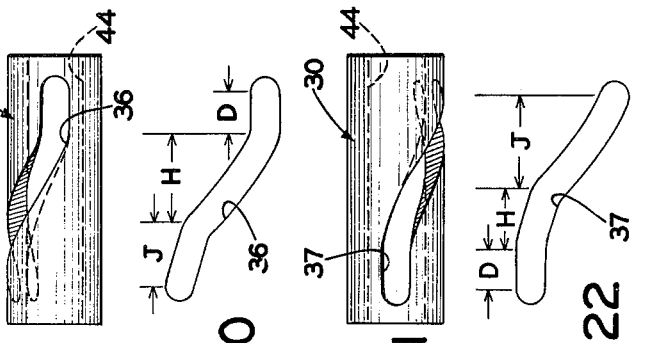

PNEUMATIC TUBE DOUBLE-DOOR SIDE OPENING CARRIER CONSTRUCTION

BACKGROUND OF THE INVENTION

1. Field of the Invention

The invention relates to carriers which move through pneumatic tube systems usually between customer and teller terminal stations, in performing banking services. More particularly, the invention relates to a captive carrier construction with at least a single pair of doors pivotally mounted on the sides of the carrier, and in which each door closes approximately one-half of a carrier access opening.

2. Description of the Prior Art

Pneumatic tube carrier systems have been used advantageously for conducting banking services because of the rapidity with which banking transaction media (such as deposit and withdrawal components which may include coins, paper money, checks, deposit slips and other similar articles) may be moved between terminals such as from a teller's terminal or station within a bank to a customer station or terminal at the other end of the pneumatic tube.

It is preferred that a captive carrier be used in many installations, particularly to prevent a customer from removing the carrier from the terminal. Otherwise, the customer may fail to replace the carrier after removal, and thus may render the equipment temporarily inoperative. Furthermore, a non-captive carrier requires additional handling and manipulation by a customer which is inconvenient, since the customer also is handling the particular banking transaction materials.

A pneumatic tube usually terminates in an upright position at each terminal with the carrier being conveyed in either an upright or sideways position by delivery drawer means to a customer. A captive carrier moving through the tube, thus usually presents one carrier end uppermost at one station and the other carrier end uppermost at the other station, unless twists or additional bends are formed in the tube. Many of these problems have been eliminated by prior carriers which have been developed having one or two doors which close the carrier access openings, in which each door has hinge means at both ends. Thus, the swinging edge of the door will always swing toward and away from the uppermost end of the carrier regardless of the position of the carrier upon arrival at the terminal. Examples of such a construction are shown in U.S. Pat. Nos. 3,059,875, 3,080,136, 3,189,297, 3,231,218 and 3,237,884.

These carrier constructions have proved satisfactory for many installations. However, certain types of terminals and carrier delivery mechanisms will rotate the carrier endwise or lengthwise 60°, 90° or 120°. These terminals may require the teller upon return of the carrier, to reach over or around the single door when the door is pivoted to open position. Likewise, the door, of the end mounted single door carrier types in most constructions pivots open through an approximate 60° angle or a maximum 90° angle. This relatively limited angular opening movement may make it inconvenient to remove large transaction materials from the payload compartment of the carrier in some situations, and permits only limited viewing of the compartment.

Thus, the need has existed for a captive pneumatic carrier construction which can be used for nearly all known types of terminal installations eliminating the need of forming twists or unnecessary bends in the connecting pneumatic tubes heretofore required to insure proper positioning of the carrier, and which provides easy access to the transaction material contained in the carrier upon opening of the carrier door or doors at either the teller and customer terminal stations.

SUMMARY OF THE INVENTION

Objectives of the invention include providing a pneumatic tube system captive carrier construction having at least a single pair of doors hingedly mounted on the carrier sides, instead of the heretofore end mounted single door carrier constructions, and in which each door of the pair closes approximately one-half of the carrier access opening; providing such a carrier construction in which a second pair of such side opening carrier doors may be mounted on the opposite side of the carrier so that the carrier upon arrival at a terminal will be properly oriented for easy access to the payload compartment by either the teller or customer; providing such a carrier construction having door latching mechanisms which are spring-biased toward closed position requiring positive operation of the latch mechanisms thereby preventing premature or accidental unlatching of the carrier during transit, and in which the doors are spring-biased toward closed position and require positive manipulation to move the doors from closed to open position; providing such a carrier construction in which the carrier terminal mechanism which actuates the doors upon arrival of the carrier at the terminal for movement between open and closed positions can be located at either or both of the carrier ends; providing such a carrier construction in which both pairs of doors, in those arrangements using two pairs of oppositely mounted side doors, may be actuated by external means at a terminal so that the payload compartment may be purged by pneumatic or mechanical means preventing retention or transaction materials therein; providing such a carrier construction in which each of the doors of the pair upon opening, swings through an acute angle past the vertical, whereby the pair of doors provides a chute-like effect at the carrier access opening for easy deposit and removal of transaction materials; and providing such a carrier construction which eliminates difficulties heretofore encountered in the art, which is of a simple and rugged construction, which achieves the stated objectives in a simple, effective, and inexpensive manner, and which solves problems and satisfies needs existing in the art.

These and other objectives and advantages may be obtained by the double-door side opening pneumatic tube captive-type carrier construction, the general nature of which may be stated as including a carrier shell having spaced side column members and end base members forming a payload compartment having at least one open side providing a carrier access opening; first and second door means, each mounted on an opposite side column member for swinging movement between open and closed position; each of the door means being adapted to close approximately one-half of the payload compartment side opening when in closed position; means urging the door means to closed position; latch means adapted to engage and hold the first and second door means in closed position; means urging the latch means to closed positions; housing means formed on at least one end of the carrier shell;

control means mounted within the housing means and operatively communicating with the latch means and door means, and being adapted to overcome the urging of the latch and door means to unlatch the latch means and to move the door means outwardly to open position when the control means is engaged by external actuation means at a pneumatic tube terminal; the control means including lever means pivotally mounted within the housing means, and rod means extending along the side column members and engagable by the lever means; cam means operatively mounted on the rod means and fixed to the door means, the cam means being formed with cam slots; and the rod means having pin means engaged in the cam slots whereby the rod means will move linearly when actuated by the lever means, and will rotate the cam means and mounted door means by the engagement of the pin means in the slots.

BRIEF DESCRIPTION OF THE DRAWINGS

A preferred embodiment of the invention - illustrative of the best mode in which applicants have contemplated applying the principles - is set forth in the following description and shown in the drawings and is particularly and distinctly pointed out and set forth in the appended claims.

FIG. 1 is a top plan view of the double-door side opening pneumatic tube carrier construction, with portions broken away and in section;

FIG. 2 is a sectional view with portions broken away, taken on line 2—2, FIG. 1;

FIG. 3 is an end elevation looking in the direction of arrows 3—3, FIG. 1;

FIG. 4 is a sectional view showing the actuating pad and rocker arm assemblies, taken on line 4—4, FIG. 1;

FIG. 5 is a sectional view showing the door latching mechanism, taken on line 5—5, FIG. 1;

FIG. 6 is a sectional view taken on line 6—6, FIG. 1, with the carrier doors shown in open position by dot-dash lines;

FIG. 7 is a perspective view showing a single rocker arm and its associated actuating pad;

FIG. 8 is a sectional view taken on line 8—8, FIG. 7;

FIG. 9 is a fragmentary perspective view of one of the door mounting cams;

FIG. 10 is a sectional view taken on line 10—10, FIG. 1;

FIG. 15 is an enlarged fragmentary sectional view taken on line 15—15, FIG. 11;

FIG. 16 is an enlarged fragmentary sectional view taken on line 16—16, FIG. 15;

FIG. 17 is an enlarged fragmentary sectional view taken on line 17—17, FIG. 13;

FIG. 18 is an enlarged fragmentary sectional view taken on line 18—18, FIG. 17;

FIG. 19 is a bottom plan view of one of the cams which mounts the overlapping door, as viewed in FIG. 1;

FIG. 20 is a flat, plan layout of the cam slot which is formed in the cam of FIG. 19;

FIG. 21 is a bottom plan view of one of the cams which mount the overlapped door, as viewed in FIG. 1; and FIG. 22 is a flat, plan layout of the cam slot which is formed in the cam of FIG. 21.

Similar numerals refer to similar parts throughout the drawings.

DESCRIPTION OF THE PREFERRED EMBODIMENT

Figure 11:
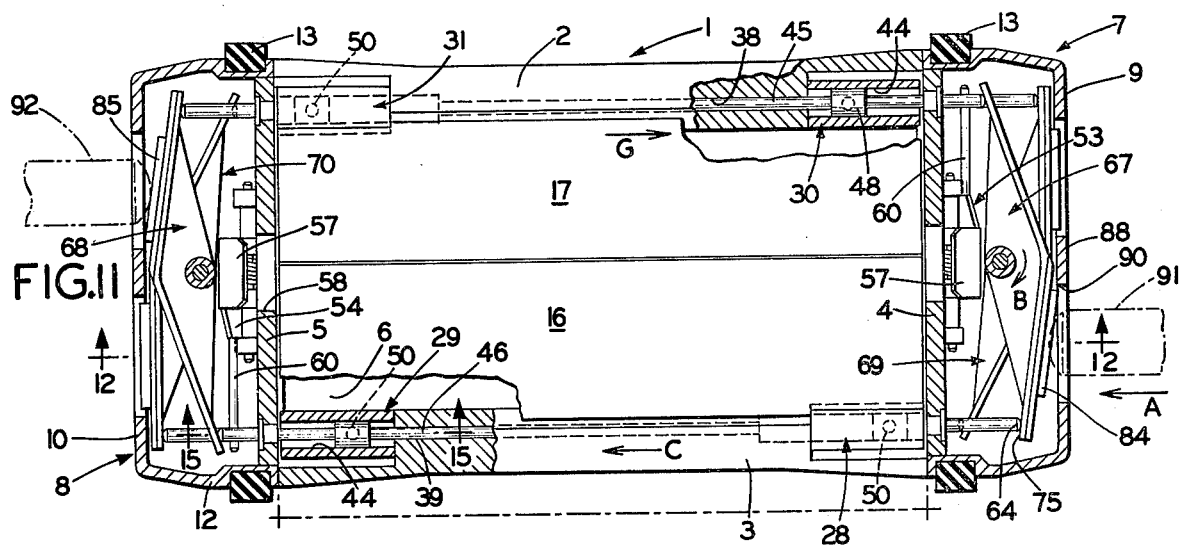
FIG. 11 is a top plan view with portions broken away and in section, somewhat similar to FIG. 1, with the door latching mechanism being shown in unlatched position, and with one of the rocker arm assemblies being engaged and partially actuated by a plunger mechanism.

The pneumatic tube double-door side opening captive carrier construction is indicated generally at 1, and is shown particularly in FIGS. 1 and 2. Carrier 1 includes a rectangular shell formed by spaced side column members 2 and 3, and end plates 4 and 5 which form a payload compartment 6.

Housings 7 and 8 are formed on the ends of carrier 1 adjacent plates 4 and 5, by generally dome-shaped end caps 9 and 10 which are secured by suitable means to end plates 4 and 5. A groove 11 is formed in the side wall 12 of each end caps 9 and 10 adjacent end plates 4 and 5, for the mounting of wear or sealing rings 13.

Carrier 1 as shown in the drawings and particularly in FIG. 6, is formed with opposite side openings 14 and 15 for access to payload compartment 6. Carrier 1 can be formed with only a single access side opening if desired, without departing from the concept of the invention.

In accordance with the invention, pairs of doors 16–17 and 18–19 enclose side openings 14 and 15, respectively. Each door 16–19 closes approximately one-half of the area of each access opening 14 and 15 of carrier 1. Thus, each pair of doors, when in closed position, provides the closure means for a carrier payload compartment access opening, instead of the heretofore single door used for known carrier constructions.

Doors 16, 17, 18 and 19 preferably are rectangularly shaped (FIG. 1) and extend between end plates 4 and 5, and from side column members 2 and 3 to just beyond the centerlines 20 of openings 14 and 15. Centerlines 20 coincide with an imaginary plane 21 (FIG. 6) passing through the longitudinal axis of carrier 1. The swinging edges 22, 23, 24 and 25 of doors 16–19 are of reduced thickness and preferably overlap when in closed position. The remaining three edges of each door overlap and engage shoulders 26 and 27 formed on and extending along side column members 2 and 3, and end plates 4 and 5, respectively, adjacent the side openings (FIGS. 1 and 10).

The control mechanism for each pair of doors 16–17 and 18–19 is similar, therefore, only the mechanism for doors 16 and 17 is described in detail. Doors 16 and 17 and the associated control mechanism are shown particularly in FIG. 1, and in the upper one-half carrier portions of FIGS. 2, 4, 5 and 6.

Doors 16 and 17 are pivotally mounted with respect to side column members 2 and 3 by pairs of generally cylindrical cams 28–29 and 30–31, respectively (FIGS. 1, 6 and 9). Cams 28–31 are hollow, having smooth internal bores 44. Downturned flanges 32 and 33 are formed integrally with the outer edges 34 and 35 of doors 16 and 17, respectively, adjacent the corners thereof. Flanges 32 and 33 are attached by welds or other means, to cam 28–29 and 30–31 for pivotally mounting doors 16 and 17 on the side column members. Cams 28–29 and 30–31 (FIGS. 19–22) are formed with specially shaped cam slots 36 and 37 which extend through the cylindrical cam walls and communicate with bores 44. Flat layouts of cam slots 36 and 37 are shown in FIGS. 20 and 22 for clarity and are described in detail below.

Openings 38 and 39 are formed in and extend longitudinally through column members 2 and 3, and align with holes 40 and 41 formed in end plates 4 and 5 (FIGS. 1, 5 and 10). Enlarged semicircular pockets 42 (FIG. 6) are formed in column members 2 and 3 at the ends of openings 38 and 39 adjacent plates 4 and 5, for receiving cams 28–31 therein. Grooves 43 (FIGS. 6, 15 and 17) are formed in column members 2 and 3 adjacent to and communicating with pockets 42, and extend generally throughout the length of pockets 42.

Rods 45 and 46 extend through openings 38 and 39 and through end plate holes 40 and 41, respectively, and terminate within housings 7 and 8. A bushing 47 preferably is mounted in each end plate hole 40 and 41 to reduce the sliding friction with respect to rods 45 and 46.

A pair of fixed sleeves 48 is mounted on each rod 45 and 46 adjacent the ends thereof, and are slidably mounted within cam bores 44 (FIGS. 15 and 17). A pin 50 is mounted on each sleeve 48 and extends through its respective cam slots 36 or 37, and into grooves 43 of side column members 2 and 3. An enlarged bore 51 is formed between pockets 42 and openings 38 and 39 (FIG. 1) at diagonally opposite ends of side column members 2 and 3. A compression spring 52 is located within each enlarged bore 51 and engages sleeve 48, biasing the sleeve toward its respective end plate 4 or 5.

A door latching mechanism indicated generally at 53 (FIGS. 1 and 5) is located within each housing 7 and 8. Each latching mechanism 53 includes a plate 54 pivotally mounted on a pin 55. Pin 55 extends between a pair of pivot blocks 56 which are attached to end plates 4 and 5 by welds or other suitable mounting means. A latching tab 57 extends inboard, generally perpendicular from the swinging end of plate 54 through an aperture 58 formed in each end plates 4 and 5. Each tab 57 is biased by a spring 59 into overlapping engagement with the corners of swinging door edges 22 and 23 to latch the doors when in closed position. A similar plate and tab assembly (FIG. 5) also is spring biased and pivotally mounted on pin 55 within each housing 7 and 8 for doors 18 and 19, when carrier 1 is provided with two pairs of double-doors as shown in the drawings.

A door latch control rod 60 is welded to plate 54 and extends transversely therefrom for engagement in a notch 61 formed in one end of each rod 45 and 46, when the doors are in closed position and mechanism 53 is in latched position (FIGS. 1 and 2). Latch control rod 60 of each latching mechanism 53 will engage a diagonally oriented end of rods 45 and 46 to maintain doors 16 and 17 in closed position, as described below.

When the doors 16 and 17 are in the closed position of FIGS. 1 and 2, an end 62 of rod 45 extends considerably further into housing 8, than the distance that the opposite or retracted end 63 extend into housing 7. The corresponding extended end 64 of rod 46 projects into housing 7 and is located diagonally opposite extended end 62 of rod 45. Likewise, retracted end 65 of rod 46 projects into housing 8 and is located diagonally opposite of retracted end 63 of rod 45.

In further accordance with the invention, a pair of rocker arms 67 and 68 are pivotally mounted, one within each housing 7 and 8, for opening and closing doors 16 and 17, respectively, upon arrival of carrier 1 at a terminal. A second pair of similar rocker arms 69 and 70 are mounted within housing 7 and 8 for controlling the opening and closing movement of doors 18 and 19, when carrier 1 is equipped with two pairs of side opening doors as shown. Only the detailed features of the rocker arms 67 and 68 which are associated with doors 16 and 17 will be described in detail, due to their similarity in construction and operation with rocker arms 69 and 70.

Rocker arms 67 and 68 (FIG. 7) are generally triangularly-shaped each having an angled base 71 which is bent at its midpoint at an approximate 55° angle. A web 72 is mounted on base 71 and extends outwardly therefrom, and is formed with an opening 73 for pivotally mounting the rocker arm within its associated housing. Web 72 joins base 71 inwardly from the offset angled ends of base 71 to provide contact areas 74 and 75 at the ends thereof, which are adapted to be engaged by ends 63–65 and 62–64, respectively, of rods 45 and 46.

Rocker arms 67–68 and 69–70 are mounted within housings 7 and 8 on pins 76 which extend through the housings and are secured to end cap side walls 12 (FIG. 2). Bosses 77 preferably are formed integrally with side walls 12 and extend inwardly to webs 72 of the rocker arms. Spacer sleeves 78 are mounted on pins 76 between the corresponding rocker arm webs to properly space and position the rocker arms in the end cap housings.

Each rocker arm 67, 68, 69 and 70 has an outwardly extending plate 80, 81, 82 and 83 welded to one section of an angled base 71, and has a pressure pad 84, 85, 86 and 87, respectively, mounted thereon (FIGS. 1, 4 and 7). Plates 80–83 and their respective pads 84–87 are secured to the particular half-sections of rocker arms 67–70 which extend generally parallel to end walls 88 of housing end caps 9 and 10, when the carrier doors are in closed position. Openings 90 are formed in housing end walls 88 and are aligned with pads 84–87 which project partially into the openings for actuation by a plunger 91 (dot-dash lines, FIGS. 11–14) or other mechanism, for controlling the opening and closing movement of door 16–19.

When doors 16 and 17 are in closed position, as shown in FIG. 1, the extended ends 62 and 64 of rods 45 and 46 engage contact areas 75 of rocker arms 67 and 68. Likewise, the retracted ends 63 and 65 of rods 45 and 46 engage contact areas 74 of rocker arms 67 and 68. Springs 52 maintain rods 45 and 46 into engagement with rocker arms 67 and 68 at all times, and biases the rocker arms toward the closed door positions shown in FIG. 1. Latch tabs 57 are maintained in latched position with carrier doors 16 and 17 by springs 59, latch control rod 60 and notch 61, with latch plates 54 generally coinciding with and abutting end plates 4 and 5.

The operation of the pneumatic tube double-door side opening carrier 1 is set forth below, and is described with respect to doors 16 and 17 which close access opening 14. Carrier 1, when traveling between distant pneumatic tube terminals is in the closed position of FIGS. 1 and 2, and usually will contain material within pay-load compartment 6. Doors 16 and 17 are maintained in closed latched position by the biasing force of springs 52, and the biasing force of springs 59 acting on latch plates 54.

The appropriate actuation mechanism for initiating opening of doors 16 and 17 is energized automatically upon arrival of carrier 1 at a terminal, or manually by a bank teller or customer. A plunger 91 (FIGS. 11–14) moves outwardly in the direction of Arrow A which is generally parallel to the longitudinal axis of carrier 1, through an opening 90 in housing end wall 88. Plunger 91 engages pad 84 mounted on rocker arm 67, pivoting rocker arm 67 in a clockwise direction, indicated by Arrow B (FIG. 11). The initial pivoting motion of rocker arm 67 moves control rod 46 linearly in the direction of Arrow C, through the engagement of contact area 75 of rocker arm 67 with extended end 64 of rod 46 (FIG. 1).

This initial motion of rod 46 moves pins 50 linearly along cam slots 36 of cams 28 and 29 a distance D, FIGS. 16 and 20, without imparting any rotation to cams 28 and 29. Cams 28 and 29 do not rotate due to the parallel alignment of that area of the cam slots represented by distance D, with respect to the axis of rod 46 and the axis of cam bore 44. Control rod 46 upon moving this initial distance D, pivots latch plate 54 located within opposite end housing 8 in the direction of Arrow E (FIG. 15), from the latched position of FIG. 2 to the unlatched position of FIG. 15, due to the engagement of latch control rod 60 in notch 61 of rod 46.

Figure 12:
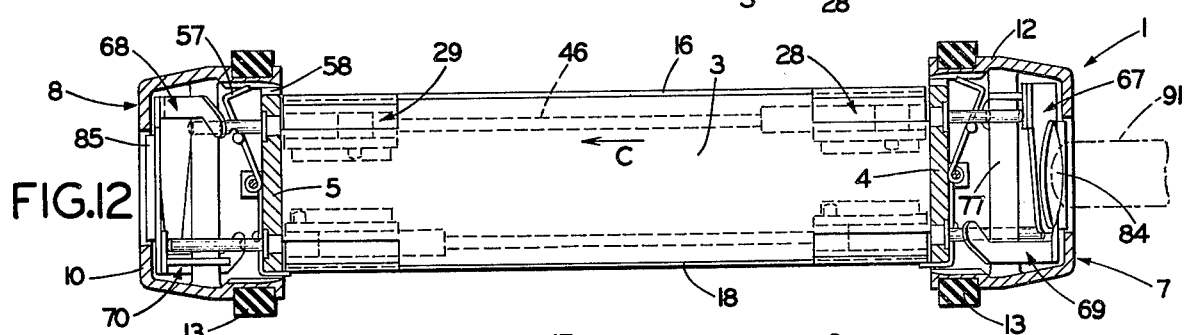
FIG. 12 is a sectional view taken on line 12—12, FIG. 11.

This initial motion through distance D of rod 46 is transmitted to opposite rod 45 through rocker arm 68 in housing 8. Rocker arm 68 is pivoted in the direction of arrow F by rod 46 (FIG. 1) which in turn moves rod 45 in the direction of Arrow G (FIG. 11). Pins 50 of rod 45 move along a similar linear distance D in cam slots 37 of cams 30 and 31 (FIGS. 21 and 22). Retracted end 63 of rod 45, in turn pivots latch plate 54 of the latching mechanism in housing 7 to unlatched position by engagement with the associated latch control rod 60, generally simultaneously with the unlatching movement of the opposite latch tab 57, as shown in FIGS. 11 and 12.

Thus, the initial engagement of plunger 91 with pad 84 moves rods 45 and 46 in opposite directions with respect to each other in side column members 2 and 3, through rocker arms 67 and 68 a distance D. This initial movement unlatches the latch mechanism 53, at both ends of doors 16 and 17, as pins 50 move along cam slots 36 and 37 without rotation of cams 28–31. Distance D for a usual oval-shaped carrier construction of the type shown in U.S. Pat. No. 3,237,884 will be approximately one-quarter inch.

Continued movement of plunger 91 in the direction of Arrow A maintains the linear movement of rods 46 and 45 in the direction of Arrows C and G respectively, while initiating pivotal movement of doors 16 and 17. Rods 45 and 46 together with cam pins 50 always move linearly without rotation, due to the projection of pins 50, which are fixed on rods 45 and 46, through the cam slots and into linearly extending grooves 43. Cams 28–31 will begin rotation about sleeves 48 as pins 50 move along cam slots 36 and 37 due to rotational or spiral-like formation of cam slots 36 and 37 on the cylindrical surface of the cams with respect to the axis of cam bore 44, as shown in FIGS. 19–22. Cam slots 36 of cams 28 and 29 which pivotally mount door 16, deviate on a greater slope from the linear paths of distance D than does the corresponding cam slots 37 of cams 30 and 31. This is shown by the sharper slope in the flat layouts of the cam slots in FIGS. 20 and 22 throughout the distances H. Thus, cams 28 and 29 will begin to pivot at a faster rate than cams 30 and 31 due to this cam slot configuration. Thereby, door 16 will swing outwardly in an opening direction prior to the opening movement of door 17, to compensate for door 16 overlapping door 17.

Pins 50 will continue to move throughout the remaining distances J of cam slots 36 and 37 as plunger 91 continues its movement through opening 90 in combination with the subsequent linear movement of rods 45 and 46, until pins 50 reach the ends of cam slots 36 and 37. Doors 16 and 17 will have swung outwardly to their open positions, as shown by dot-dash lines in FIG. 6, as pins 50 reach their respective ends of the cam slots.

The pins 50 which are engaged with cams 28 and 29 will move from right-to-left along cam slots 36 (FIGS. 19 and 20) during opening movement of doors 16. The pins 50 which are engaged with cams 30 and 31 in turn will move from left-to-right along cam slots 37 (FIGS. 21 and 22) during opening movement of doors 17.

Figure 13:
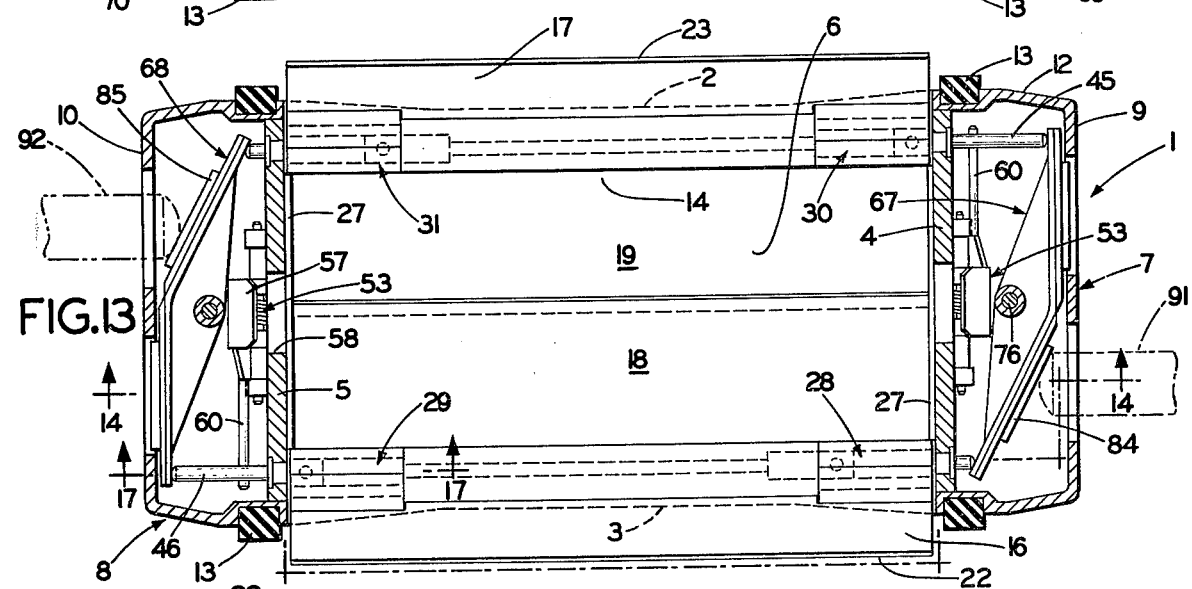
FIG. 13 is a view similar to FIG. 11, with the top pair of doors being shown in open position after complete actuation of the rocker arm assembly by an external plunger mechanism.
Figure 14:
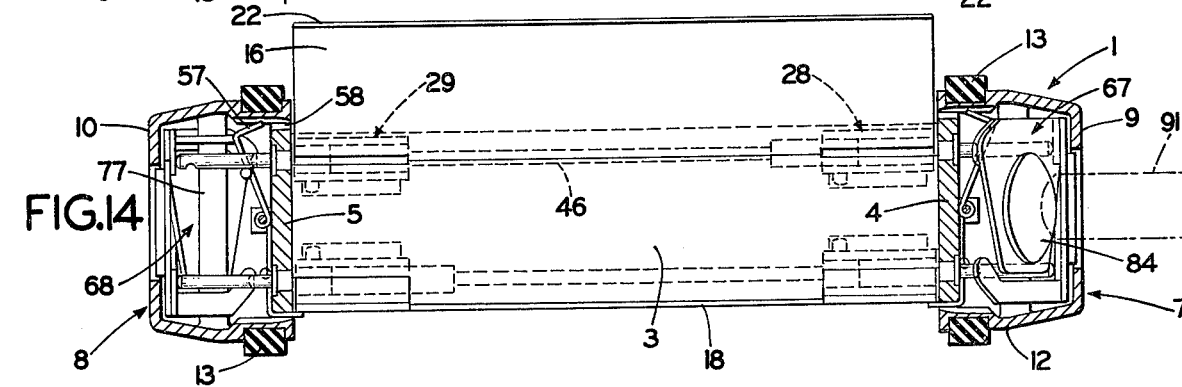
FIG. 14 is a sectional view taken on line 14—14, FIG. 13.

Doors 16 and 17 when in the fully open position of FIGS. 13 and 14, and the dot-dash position of FIG. 6, provide convenient access to any material within payload compartment 6 from any position adjacent the carrier. Doors 16 and 17, likewise, provide a chute-like effect (FIG. 6) for placement of material into payload compartment 6 due to their swinging movement through an approximate 20° angle beyond the vertical position with respect to the carrier shell.

Doors 16 and 17 will close automatically upon retraction of plunger 91 due to the biasing force of springs 52 which are compressed upon movement of rods 45 and 46 in the direction of Arrows C and G. Springs 52 through their engagement with sleeves 48, move rods 45 and 46 in opposite directions to that of Arrows C and G. This return force is transmitted through rocker arms 67 and 68, in a similar manner as when the rocker arms are initially actuated by plunger 91.

Pins 50 move along cam slots 36 and 37 providing a positive pivoting closing action to doors 16 and 17. Door 17 closes slightly ahead of door 16 due to the slopes or degree of rotation of the cam slots throughout distances J and H to insure the correct overlapping of swinging edges 22 and 23 when in closed position. Latch plates 54 and tabs 57 return automatically to the latched positions of FIGS. 1 and 2 after closing of doors 16 and 17 by the biasing force of springs 59. Latch plates 54 are prevented from returning to latched position prior to doors 16 and 17 being closed, due to the engagement of latch control rods 60 with rods 45 and 46, adjacent ends 63 and 65, thereof, as shown in FIG. 17.

Although, the above-described sequence of operation appears to be a number of individual steps requiring a considerable time period to accomplish; in actual operation, the entire opening and closing sequences are performed as single smooth operations requiring only seconds to complete. Doors 16 and 17 and latch tabs 57 will in effect, "snap back" into closed positions upon retraction of plunger 91, due to the biasing effect of springs 52 and 59.

Among the important features and advantages achieved by the particular arrangement of the actuating mechanism of carrier 1, is the ability to open doors 16 and 17 from either end of the carrier. This can be accomplished by a second or alternate actuator plunger 92, shown by double dot-dash lines in FIGS. 11 and 13. Plunger 92 will initially engage pad 85 in control housing 8 which results in the same series of steps and movements of rods 45 and 46 and their associated cams and cam pins for opening doors 16 and 17, as accomplished by plunger 91.

Carrier 1 enables a pneumatic tube system to be designed without regard to the orientation of the carrier end in a terminal, eliminating directional bends heretofore necessary to be formed in the connecting pneumatic tube line to insure proper positioning of the carrier upon arrival at the terminal for actuation of the door mechanism. Carrier 1 can be actuated at a particular terminal by a plunger 91 positioned at the right-hand carrier end, equally effective as by a left-hand orientated plunger 92 without affecting or changing the carrier door opening mechanism.

Although the above-described construction and sequence of operations are with respect to doors 16 and 17 and the associated control mechanism therefore, these same steps, features and advantages are applicable to bottom doors 18 and 19 shown in FIG. 2 and in FIGS. 15–19. Thus, when carrier 1 is provided with two pairs of doors, as shown in the drawings, either pairs 16–17 and/or 18–19 are operable by means of a plunger or other actuating mechanism located at a terminal.

Actuation of either plungers 91 or 92 engaging pads 84 and 85, respectively, will open doors 16 and 17, and actuation of a third or fourth plunger means (not shown) engaging pads 86 and 87 will open doors 18 and 19. In certain installations, it may be desirable to open both pairs of carrier doors to insure a complete purging of compartment 6 by pneumatic or mechanical means, for example in using carrier 1 for making night deposits or the like. This can be accomplished by actuating either of pads 84 or 85, together with the actuation of either of pads 86 or 87.

Carrier 1, thus can be formed with a single access opening 14 or 15 closed by a pair of doors, each of which closes approximately one-half of the access opening, or can be formed with a pair of opposite carrier access openings, each of which is closed by a separate pair of doors.

It is readily understood and recognized that various other arrangements of components, such as a gear-gear rack arrangement, cam-cam roller follower arrangement, etc. may be located within the control housing at one of both ends of the carrier to control the opening and closing movements of one or two pairs of carrier doors. Likewise, these control mechanisms can be actuated by terminal plunger means which extend from the terminal in directions parallel with or transverse to the longitudinal axis of the carrier. Latch means also can be associated with these other arrangements and will be actuated automatically just prior to the pivotal opening movement of the side mounted doors by the external plunger mechanism.

Thus, the pneumatic tube double-door side opening carrier construction provides a carrier having at least one carrier access opening which is closed by a pair of doors, which doors are mounted on the sides of the carrier, in contrast to the heretofore single end mounted door, and in which each door of the pair closes approximately one-half of the carrier access opening; in which latch means are urged, preferably by spring means, into latching position with the doors, and are moved to unlatched position when the carrier door control mechanism is actuated by external plunger means at a terminal; in which the mechanism for controlling swinging movement of the doors is located within one or both end caps of the carrier and is actuated by an external plunger means; and in which the external plunger means may extend from the terminal either parallel with or transverse to the longitudinal axis of the carrier for engagement with either one or both ends of the carrier for actuation of the control mechanism for the closure doors.

Accordingly, the present invention provides a new pneumatic tube carrier construction which eliminates bends and twists in the pneumatic tube which connects distant terminals, heretofore required for correct orientation of the carrier at the terminal; and provides a carrier construction which achieves all the enumerated objectives, provides for eliminating difficulties encountered with prior carrier constructions, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the pneumatic tube double-door side opening carrier construction is constructed, assembled and operated, the characteristics of the new construction, and the advantageous, new and useful results obtained; the new and useful structures, devices, elements, arrangements, parts and combinations are set forth in the appended claims.

We claim:

1. Pneumatic tube carrier construction of the type having a carrier shell formed by spaced side column members and spaced base members, and in which the base members are joined with and extend across the ends of the column members to form a payload compartment having at least one access side opening; first and second door means, each mounted on an opposite side column member for swinging movement between open and closed positions; each of said door means being adapted to close approximately one-half of the payload compartment side opening when in closed position; latch means adapted to hold the first and second door means in closed position; first housing means formed on at least one end of the carrier shell adjacent one of the base members; and control means mounted within the housing means and operably connected with the latch means and door means, said control means being actuated to unlatch the latch means and to move the door means outwardly into open position when the control means is engaged by an external actuator at a pneumatic tube terminal.

2. The construction defined in claim 1 in which first spring means urge the first and second door means toward closed position; and in which second spring means urge the latch means toward latching position.

3. The construction defined in claim 1 in which the control means includes first lever means pivotally mounted within the first housing means; in which the first lever means is operatively connected to the door means; and in which the first lever means has a portion adapted to be engaged by an external actuator to pivot said first lever means to move the door means to open position.

4. The construction defined in claim 3 in which second housing means is formed on the other end of the carrier shell; in which longitudinally extending openings are formed in the side column members and communicate with the first and second housing means; in which rod means extend through the side column openings and terminate within the first and second housing means; in which said rod means are operatively connected to the door means; in which the first lever means engage the rod ends within the first housing means; in which second means operatively connect the other ends of the rod means within the second housing means; in which the rod means are moved linearly in opposite directions within the side column member openings to open the door means; and in which the movement of the external actuator is transmitted to the rod means through the first lever means and second means.

5. The construction defined in claim 4 in which the second means comprising lever means similar to the first lever means; in which said second lever means is pivotally mounted within the second housing means; and in which the ends of said second lever means engage the ends of the rod means with the second housing means.

6. The construction defined in claim 4 in which first spring means bias the door means toward closed position; in which said first spring means operatively engage the rod means; and in which said first spring means bias said rod means in opposite directions within the side column openings.

7. The construction defined in claim 4 in which the first housing means is formed with an opening for receiving an external actuator therein; and in which said opening communicates with the first lever means for actuation of said lever means by the extension of the external actuator through said housing opening.

8. The construction defined in claim 1 in which the latch means includes a latch plate having an outwardly extending latching tab; in which an aperture is formed in the carrier shell base member adjacent the first housing means; in which the latch plate is pivotally mounted within the first housing means, with the latching tab being movable through the base member aperture for engagement with the swinging edges of the door means to hold the door means in closed position; and in which spring means biases the latching tab towards engagement with the door means edges.

9. The construction defined in claim 1 in which second housing means is formed on the carrier end opposite of the first housing means; in which the control means for movement of the first and second door means includes rod means extending along the side column members, and further includes lever means mounted within the first and second housing means; in which the door means are operatively connected to the rod means; in which the lever means are operatively engagable with the ends of the rod means; and in which the lever means in at least one of said housing means is adapted to be engaged by an external actuator whereby movement of the said engaged lever means moves the rod means linearly along the side column members imparting swinging movement of the door means.

10. The construction defined in claim 9 in which each of the door means is operatively connected to the rod means by cam means.

11. The construction defined in claim 10 in which the cam means each includes a generally cylindrical hollow cam formed with a bore and a cam slot; in which the cam slot extends along the cam in a spiral-like configuration and communicates with the cam bore; in which the rod means extends through the cam bore; in which pin means is mounted on the rod means and engages the cam slot; and in which the pin means is confined to linear movement with respect to the side column members, whereby the cam means and connected door means move about the rod means as the pin means moves along the cam slot.

12. The construction defined in claim 11 in which spring means is operatively engaged with the rod means to urge said rod means and associated door means toward closed position.

13. The construction defined in claim 11 in which the cam slots each have a section which extends parallel with the axis of the cam bore; and in which the pin means move through the parallel cam slot sections to unlatch the door means latching means without imparting rotation to the cam means.

14. The construction defined in claim 11 in which the cam slots each have sections which extend in a spiral-like manner with respect to the axis of the cam bore; and in which said cam slot sections of the cams which mount the first door means have a greater amount of twist then does the corresponding cam slot sections of the cams which mount the second door means, whereby said first door means begins to swing toward open position at a faster rate than does the second door means.

15. The construction defined in claim 11 in which the cam slots each have at least first and second sections which extend in a spiral-like manner with respect to the axis of the cam bore; in which the first cam slot sections of the cams which mount the first door means have a greater amount of twist than does the corresponding first cam slot sections of the cams which mount the second door means, whereby the first door means initially begins to swing toward open position at a faster rate than does the second door means; and in which the second cam slot sections of the cams which mount the second door means have a greater amount of twist than does the corresponding second cam slot sections of the cams which mount the first door means, whereby the second door means after initial opening begins, swings toward open position at a faster rate than does the first door means.

16. The construction defined in claim 9 in which pad means is mounted on the lever means; in which opening means is formed in the housing means; and in which an external actuator is adapted to extend into the housing opening means and engage the pad means for actuating the lever means.

17. The construction defined in claim 1 in which the first and second door means each swing through an angle greater than 90° when moving between open and closed positions.

18. The construction defined in claim 1 in which second housing means is formed on an end of the carrier shell opposite of the first housing means; in which the carrier shell is formed with a second access side opening opposite of the first access opening; in which third and fourth door means are mounted on the side column members for swinging movement between open and closed positions, with each of said third and fourth door means being adapted to close approximately one-half of the second access side opening; in which second latch means is mounted within at least one of the housing means and operatively engage the third and fourth door means when said third and fourth door means are in closed position; in which second control means is mounted within the second housing means and communicates with the second latch means and third and fourth door means; in which the second control means is adapted to unlatch the second latch means and to move the third and fourth door means outwardly into open position when said second control means is engaged by an external actuator at a pneumatic tube terminal; and in which the second control means, second latch means and movement of the third and fourth door means is independent of the control means and latch means for the first and second door means, and movement of the first and second door means.

* * * * *